Patented Oct. 21, 1952

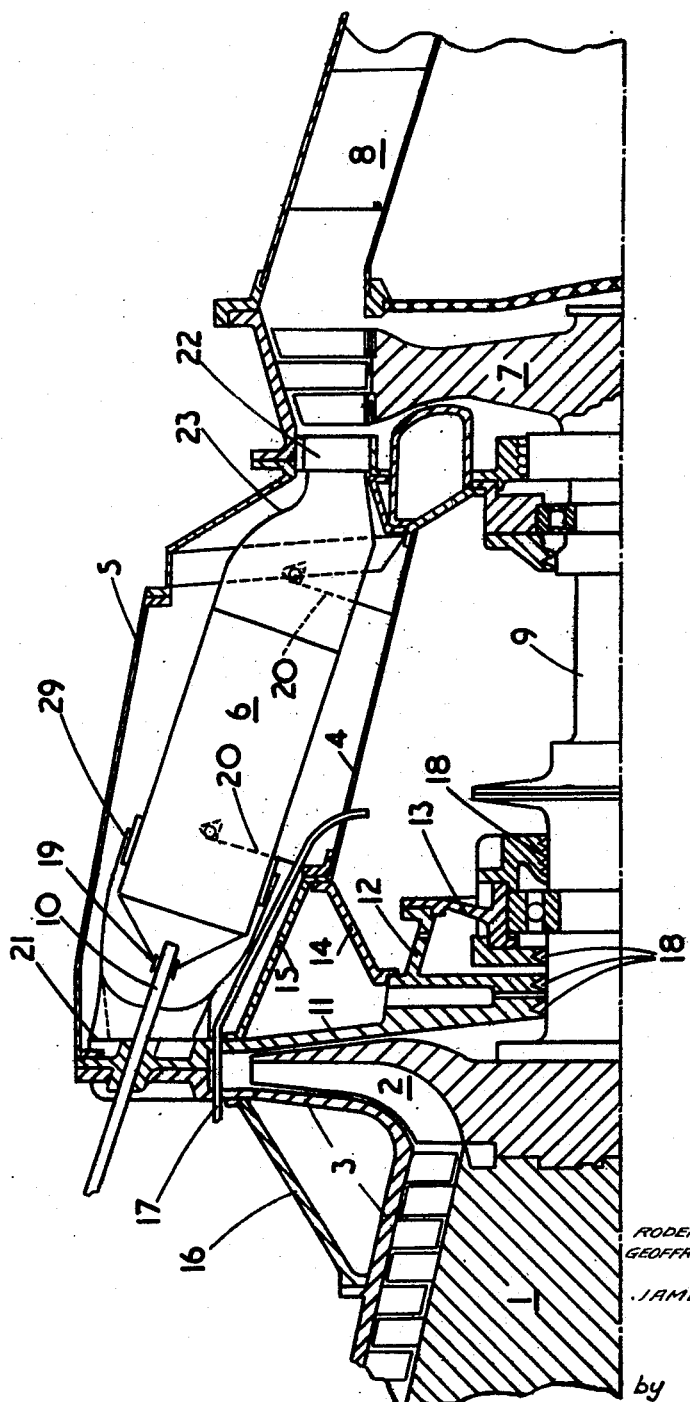

2,614,386

UNITED STATES PATENT OFFICE 2,614,386

SUPPORTING AND REINFORCING STRUCTURE FOR GAS TURBINE ENGINES

Roderick Cristall McLeod, Cropston, Leicester, Geoffrey Bertram Robert Feilden, Lutterworth, near Rugby, and James Hodge, Narborough, Leicester, England, assignors to Power Jets (Research and Development) Limited, London, England Application February 13, 1946, Serial No. 647,250
In Great Britain February 20, 1945

4 Claims. (Cl. 60—39.37)

This invention relates to a gas turbine power plant comprising a coaxial compressor and turbine axially spaced in tandem and connected by shafting to form a single rotary unit driven by the turbine, and accommodating in the space between them, a combustion system anularly surrounding said shaft and through which working fluid is supplied by the compressor to the turbine with the general direction of flow being in an axial direction. The invention has particular reference to cases in which the compressor has a single intake eye arranged unilaterally, being, for example, a single entry centrifugal compressor, especially where this compressor is the final stage of a multistage compressor. In such a case, more especially when the general construction is required to be light but robust as in an aero engine, the design problem arises of adequately stiffening the rear side of the compressor casing, i. e., the side remote from the intake, which side will normally be an annular wall of very considerable superficial area which has to resist the internal compressor pressure and which may at the same time have to support in the region of its centre a bearing arrangement for the shaft of the compressor rotor. The problem may be further complicated by the need to attach the compressor at this rear side to the remainder of the engine or machine rigidly and yet with economy of weight, the attachment being such as to make due allowance for thermal expansion, distortion, etc. as well as for the expected loads. The thermal problem itself may be exaggerated if in the nature of the attachments these are exposed to high temperatures, for example actually forming part of combustion arrangements. The invention seeks to provide a construction which conforms with the requirements in a relatively simple manner and without the introduction of manufacturing difficulties. With this end in view, in a gas turbine plant of the character indicated, the compressor has on its downstream wall a hollow box-like reinforcing structure of generally annular form coaxially surrounding the driving shaft and with which is structurally integrated one end of a stiff tubular member also enclosing the shaft, the other end of which member is structurally integrated with the stationary structure of the turbine to form therewith a substantially rigid unit and to serve as a major stress-carrying "backbone" element of the structure unifying the compressor and turbine sections of the unit.

A specific application of the invention is to an aircraft engine for jet or partly jet propulsion in which there is a multistage axial flow compressor at the front of the engine with a forwardly facing intake, this axial flow compressor discharging into a single-stage centrifugal compressor from the outlets of which the compressed air flows into an annular air casing containing a circular series of flame tubes, the discharge from this combustion arrangement being at the nozzle of an axial flow turbine which is spaced from the compressor by the length of the combustion arrangements. The compressor as a whole is coaxial with the turbine, drive between the two being established by what is in effect a single shaft affording direct coupling. This shaft has a bearing immediately in front of the turbine, a middle bearing just to the rear of the centrifugal compressor and a front bearing in front of the axial flow compressor. The invention is applied primarily to the construction in the region of the rear downstream side of the centrifugal compressor and the front or upstream side of the turbine, though in a particular application which will be considered by way of example, there may be supplementary reinforcement in front of the compressor.

According to further features of the invention the reinforcing structure at the compressor or turbine, or both, may include parts defining fixed bearing structure for the compressor turbine shaft and means may be provided for maintaining under pressure the atmosphere within parts of said reinforcing structure, especially such parts defining bearing structure for the compressor shaft.

According to still another feature of the invention, the interior of said fixed bearing structure is arranged to have communication with the interior of the compressor casing to permit a flow of cooling air to take place through the bearing. In order that the invention may be clearly understood and readily carried into effect, the same will now be more fully described with reference to the example of construction illustrated in the drawing, which is a longitudinal half section of so much of a jet propulsion gas turbine power plant for aircraft as is needed for an appreciation of the invention. This plant comprises a compressor having a multistage axial flow section 1 and a centrifugal final stage 2 accommodated in a unitary casing 3, the general form of the axial flow section being convergent to its outlet to the centrifugal stage; a combustion system comprising an annular aircasing formed by inner and outer sheet metal walls 4, 5, enclosing an annularly arranged series of flame tubes 6; and a turbine 7 exhausting to a propulsive jet duct 8 and driving the compressor through a shaft 9. In the arrangement thus briefly described, the compressor supplies air both through and around the flame tubes 6 but combustion of fuel, which is supplied by burners 10, takes place only within the tubes 6. The entire power plant is assumed to be symmetrical about its horizointal centre line passing through the shaft 9.

The rear wall 11 of the centrifugal compressor stage 2 extends from the region of the compressor diffuser system inwardly to the shaft 9, which it surrounds. Said wall is reinforced centrally by a boxlike structure formed by a frusto-conical axially extending flange 12, and a dished generally radially extending annular member 13 secured to the flange 12, which parts together constitute a fixed housing for the bearing of shaft 9. The wall 11 is further reinforced, and at the same time the inner wall 4 of the aircasing is mounted thereon, by means of frusto-conical sheet metal members 14, 15 which, in section, form a V having its legs based on the wall 11 and flange 12, and its apex joined to the wall 4 of the aircasing. As in the case illustrated, the axial flow section of the compressor is comparatively long, the outward sweep of the compressor casing 3 to the diffuser zone of the centrifugal stage is supplementarily reinforced by a frusto-conical web 16 in order to stiffen the compressor assembly as a whole. Alternatively, individual struts may be provided at that point.

The inner chamber enclosed by the aircasing wall 4 is maintained under pressure by air supplied through a pipe 17 from a convenient point in the plant, thus compensating for the external pressure on the aircasing. This pressure is arranged to be higher than that existing on the compressor side of the wall 11 so that there is a constant leakage of air to the compressor through the shaft bearing, which is provided with suitable seals 18 as indicated to restrict the flow of air to a desired rate. Communication is also provided between the main inner or shaft chamber enclosed by the wall 4, and the chambers defined by the walls 11, 12, 13, 14, 15. By this means a high degree of uniformity of temperature may be attained as between the compressor wall 11 and the various parts 12, 13, 14, 15 constituting the reinforcements thereof and support of the aircasing wall 4, whilst the flow of air through the bearing may also be utilised to assist lubrication. The internal pressure also contributes to the mechanical strength of the structure as a whole in so far as serious differential pressures tending to crush hollow structures are eliminated.

The outer wall 5 of the aircasing extends from the outside margin of the centrifugal compressor casing rearwardly to the turbine, forming a second attachment between the compressor assembly and the turbine end, and the result is an extremely stiff and robust construction of the engine as a whole, highly resistant to bending and torsional stresses and also to distortion whilst permitting considerable design latitude for thermal expansion and contraction even where steep temperature gradients are to be met, such as arise for example when an engine has been running for sime time and is suddenly shut down and in so doing passes a large quantity of what may be extremely cold air.

Although it is preferred to maintain the shaft chamber enclosed by the wall 4 at a higher pressure than the last (centrifugal) compressor stage, so that leakage takes place to the latter, it would be possible to reverse the system and allow leakage to take place from the impeller chamber of the centrifugal compressor to the shaft chamber and the chambers defined by the various reinforcing parts.

We claim:

1. A gas turbine power plant comprising; a compressor assembly consisting of a compressor rotor and an enclosing compressor stationary structure including a wall on the downstream side of the compressor rotor; a turbine assembly consisting of a turbine rotor coaxial with and axially spaced from said compressor rotor and an enclosing turbine stationary structure; a driving shaft carrying said rotors; a combustion system annularly disposed about said shaft between said assemblies and defining a flow path from the compressor to the turbine extending generally in the axial direction; an outer tubular member surrounding said combustion system; a hollow box-like annular reinforcing structure coaxial with said shaft, and rigidly attached to said compressor wall at two concentric localities thereon; an inner tubular member coaxially enclosing said shaft and rigidly attached to said reinforcing structure at one end and to said turbine stationary structure at the other end to form a main means for supporting the power plant structure downstream of said compressor; and bearing structure carried in said compressor wall and supporting said shaft.

2. A gas turbine power plant comprising, a compressor assembly consisting of a compressor rotor and an enclosing compressor stationary structure including a wall on the downstream side of the compressor rotor; a turbine assembly consisting of a turbine rotor coaxial with and axially spaced from said compressor rotor and an enclosing turbine stationary structure; a driving shaft carrying said rotors; a combustion system annularly disposed about said shaft between said assemblies and defining a flow path from the compressor to the turbine extending generally in the axial direction; a hollow box-like annular reinforcing structure coaxial with said shaft, and rigidly attached to said compressor wall at two concentric localities thereon, said box-like structure being formed by two frustoconical ring members joined together to form in axial cross section a V having its legs rigidly attached to the compressor wall; a tubular member coaxially enclosing said shaft and rigidly attached at one end to said apex of said V-shaped member, and to said turbine stationary structure at the other end; and bearing structure carried in said compressor wall and supporting said shaft.

3. A gas turbine power plant comprising; a compressor assembly consisting of a compressor rotor and an enclosing compressor stationary structure including a wall on the downstream side of the compressor rotor; a turbine assembly consisting of a turbine rotor, coaxial with and axially spaced from said compressor rotor, and an enclosing turbine stationary structure including a wall on the upstream side of said turbine rotor; a driving shaft carrying said rotors; a combustion system annularly disposed about said shaft between said assemblies and defining a flow path from the compressor to the turbine generally in the axial direction; two hollow box-like annular reinforcing structures coaxial with said shaft, one being rigidly attached to said compressor wall at two concentric localities thereon, and the other being rigidly attached to said turbine wall at two concentric localities thereon; a tubular member coaxially enclosing said shaft and rigidly attached at each end to said reinforcing structures; and bearing structure carried in each of said walls and supporting said shaft.

4. A gas turbine power plant as claimed in claim 3 wherein the box-like reinforcing structure on the compressor wall is formed by frusto-conical ring members joined together at one end to form in axial cross-section a V having its legs rigidly attached to the compressor wall and its apex connected to said tubular member.

RODERICK CRISTALL McLEOD.
GEOFFREY BERTRAM ROBERT FEILDEN.
JAMES HODGE.

REFERENCES CITED

The following references are of record in the file of this patent:

UNITED STATES PATENTS

| Number | Name | Date |
| --- | --- | --- |
| 1,827,246 | Lorenzen | Oct. 13, 1931 |
| 2,080,425 | Lysholm | May 18, 1937 |
| 2,216,731 | Birmann | Oct. 8, 1940 |
| 2,353,929 | Ray | July 18, 1944 |
| 2,364,189 | Büchi | Dec. 5, 1944 |
| 2,432,359 | Streid | Dec. 9, 1947 |
| 2,459,935 | Halford | Jan. 25, 1949 |
| 2,468,461 | Price | Apr. 26, 1949 |
| 2,469,439 | Lundquist | May 10, 1949 |
| 2,548,886 | Howard | Apr. 17, 1951 |